United States Patent
Zhu et al.

(10) Patent No.: US 12,185,423 B2
(45) Date of Patent: Dec. 31, 2024

(54) PERFORMANCE INDICATORS FOR COMBINATIONS OF MACHINE LEARNING MODELS

(71) Applicant: QUALCOMM Incorporated, San Diego, CA (US)

(72) Inventors: Xipeng Zhu, San Diego, CA (US); Gavin Bernard Horn, La Jolla, CA (US); Taesang Yoo, San Diego, CA (US); Rajeev Kumar, San Diego, CA (US); Shankar Krishnan, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 17/659,129

(22) Filed: Apr. 13, 2022

(65) Prior Publication Data
US 2023/0336972 A1   Oct. 19, 2023

(51) Int. Cl.
*H04W 8/22* (2009.01)
*G06N 20/00* (2019.01)
*H04W 24/02* (2009.01)
*H04W 28/16* (2009.01)

(52) U.S. Cl.
CPC ............. *H04W 8/22* (2013.01); *G06N 20/00* (2019.01); *H04W 24/02* (2013.01); *H04W 28/16* (2013.01)

(58) Field of Classification Search
CPC ........ G06F 9/5027; G06N 20/00; G06N 3/04; G06N 3/098; H04L 41/0853; H04L 41/145; H04L 41/16; H04L 43/06; H04L 43/08; H04W 24/02; H04W 28/16; H04W 8/22
See application file for complete search history.

(56) References Cited

U.S. PATENT DOCUMENTS

| | | |
|---|---|---|
| 2020/0366326 A1 | 11/2020 | Jassal et al. |
| 2021/0105611 A1 | 4/2021 | Lee et al. |
| 2021/0185515 A1 | 6/2021 | Bao et al. |
| 2021/0342687 A1 | 11/2021 | Wang et al. |
| 2021/0345134 A1 | 11/2021 | Ottersten et al. |
| 2021/0390434 A1 | 12/2021 | Bai et al. |

FOREIGN PATENT DOCUMENTS

| | | |
|---|---|---|
| WO | 2021224705 A1 | 11/2021 |
| WO | 2022008037 A1 | 1/2022 |
| WO | 2022013095 A1 | 1/2022 |

OTHER PUBLICATIONS

International Search Report and Written Opinion—PCT/US2023/063166—ISA/EPO—Jun. 23, 2023.

*Primary Examiner* — Nader Bolourchi
(74) *Attorney, Agent, or Firm* — Harrity & Harrity, LLP

(57) ABSTRACT

Various aspects of the present disclosure generally relate to wireless communication. In some aspects, a user equipment (UE) may transmit capability information that indicates support for one or more model combinations of machine learning (ML) models, wherein the capability information further indicates one or more performance parameters of an ML model of the ML models with respect to a model combination of the one or more model combinations that includes the ML model. The UE may receive one or more indications to use one or more of the ML models based at least in part on the capability information. Numerous other aspects are described.

30 Claims, 11 Drawing Sheets

PERFORMANCE INDICATORS FOR COMBINATIONS OF MACHINE LEARNING MODELS

FIELD OF THE DISCLOSURE

Aspects of the present disclosure generally relate to wireless communication and to techniques and apparatuses for parameters for combinations of machine learning models.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting capability information that indicates support for one or more model combinations of machine learning (ML) models, wherein the capability information further indicates one or more performance parameters of an ML model of the ML models with respect to a model combination of the one or more model combinations that includes the ML model. The method may include receiving one or more indications to use one or more of the ML models based at least in part on the capability information.

Some aspects described herein relate to a method of wireless communication performed by a network node. The method may include receiving capability information that indicates support by a UE for one or more model combinations of ML models, wherein the capability information further indicates one or more performance parameters of an ML model of the one or more ML models with respect to a model combination of the one or more model combinations that includes the ML model. The method may include transmitting one or more indications to use one or more of the ML models based at least in part on the capability information.

Some aspects described herein relate to a UE for wireless communication. The UE may include a memory and one or more processors coupled to the memory. The one or more processors may be configured to transmit capability information that indicates support for one or more model combinations of ML models, wherein the capability information further indicates one or more performance parameters of an ML model of the ML models with respect to a model combination of the one or more model combinations that includes the ML model. The one or more processors may be configured to receive one or more indications to use one or more of the ML models based at least in part on the capability information.

Some aspects described herein relate to a network node for wireless communication. The network node may include a memory and one or more processors coupled to the memory. The one or more processors may be configured to receive capability information that indicates support by a UE for one or more model combinations of ML models, wherein the capability information further indicates one or more performance parameters of an ML model of the one or more ML models with respect to a model combination of the one or more model combinations that includes the ML model. The one or more processors may be configured to transmit one or more indications to use one or more of the ML models based at least in part on the capability information.

Some aspects described herein relate to a non-transitory computer-readable medium that stores a set of instructions for wireless communication by a UE. The set of instructions, when executed by one or more processors of the UE, may cause the UE to transmit capability information that indicates support for one or more model combinations of ML models, wherein the capability information further indicates one or more performance parameters of an ML model of the ML models with respect to a model combination of the one or more model combinations that includes the ML model. The set of instructions, when executed by one or more processors of the UE, may cause the UE to receive one or more indications to use one or more of the ML models based at least in part on the capability information.

Some aspects described herein relate to a non-transitory computer-readable medium that stores a set of instructions for wireless communication by a network node. The set of instructions, when executed by one or more processors of the network node, may cause the network node to receive capability information that indicates support by a UE for one or more model combinations of ML models, wherein the capability information further indicates one or more performance parameters of an ML model of the one or more ML models with respect to a model combination of the one or more model combinations that includes the ML model. The set of instructions, when executed by one or more processors of the network node, may cause the network node to transmit one or more indications to use one or more of the ML models based at least in part on the capability information.

Some aspects described herein relate to an apparatus for wireless communication. The apparatus may include means for transmitting capability information that indicates support for one or more model combinations of ML models, wherein the capability information further indicates one or more performance parameters of an ML model of the ML models with respect to a model combination of the one or more model combinations that includes the ML model. The apparatus may include means for receiving one or more indications to use one or more of the ML models based at least in part on the capability information.

Some aspects described herein relate to an apparatus for wireless communication. The apparatus may include means for receiving capability information that indicates support by a UE for one or more model combinations of ML models, wherein the capability information further indicates one or more performance parameters of an ML model of the one or more ML models with respect to a model combination of the one or more model combinations that includes the ML model. The apparatus may include means for transmitting one or more indications to use one or more of the ML models based at least in part on the capability information.

Aspects generally include a method, apparatus, system, computer program product, non-transitory computer-readable medium, user equipment, base station, wireless communication device, and/or processing system as substantially described herein with reference to and as illustrated by the drawings and specification The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence (AI) devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
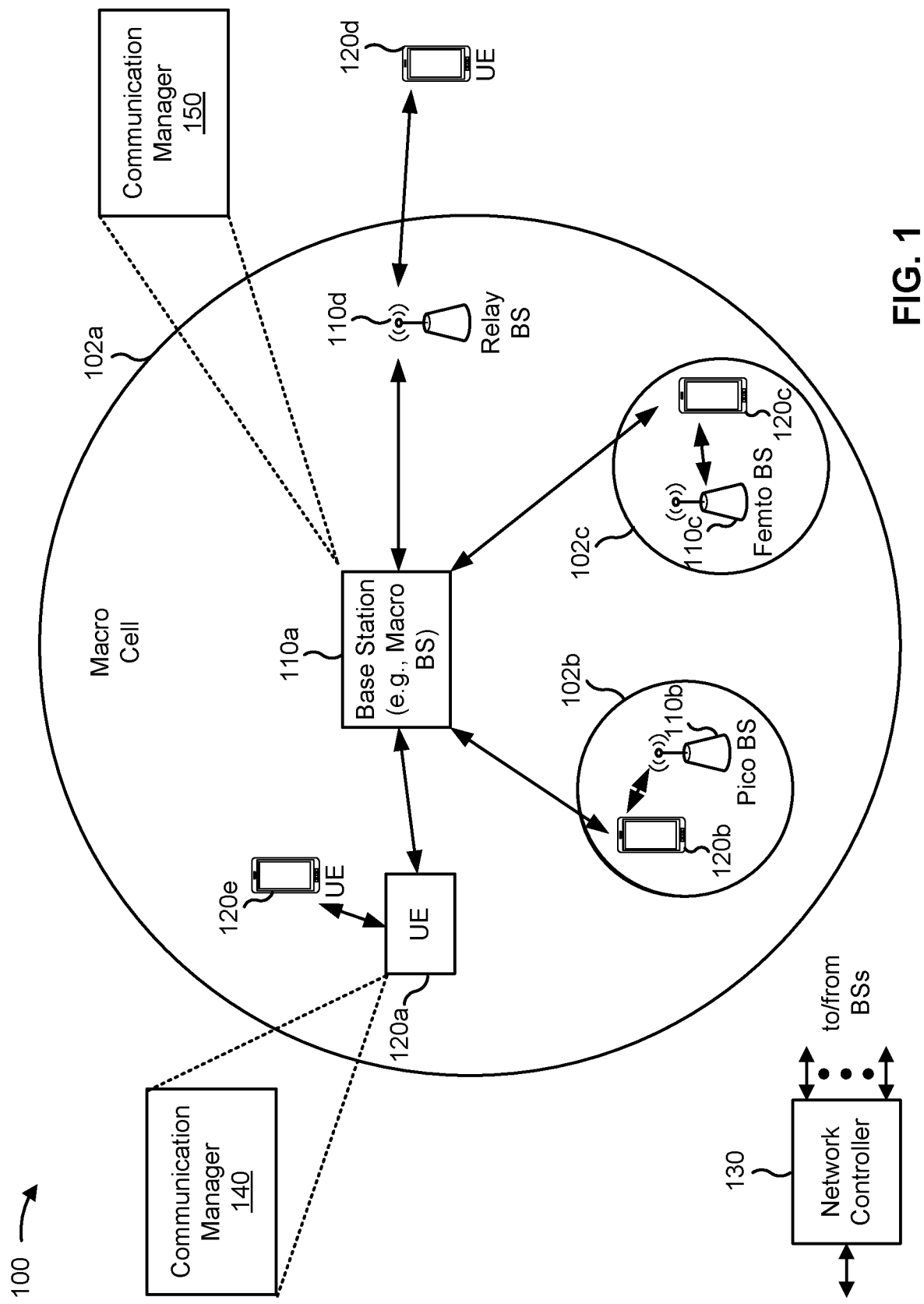
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit capability information that indicates support for one or more model combinations of ML models, wherein the capability information further indicates one or more performance parameters of an ML model of the ML models with respect to a model combination of the one or more model combinations that includes the ML model; and receive one or more indications to use one or more of the ML models based at least in part on the capability information. Additionally, or alternatively, the communication manager 140 may perform one or more other operations described herein.

In some aspects, a network node (e.g., the base station 110) may include a communication manager 150. As described in more detail elsewhere herein, the communication manager 150 may receive capability information that indicates support by a UE for one or more model combinations of ML models, wherein the capability information further indicates one or more performance parameters of an ML model of the one or more ML models with respect to a model combination of the one or more model combinations that includes the ML model; and transmit one or more indications to use one or more of the ML models based at least in part on the capability information. Additionally, or alternatively, the communication manager 150 may perform one or more other operations described herein.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU or centralized unit), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

As indicated above, FIG. 1 is provided as an example. Other examples may differ from what is described with regard to FIG. 1.

Figure 2:
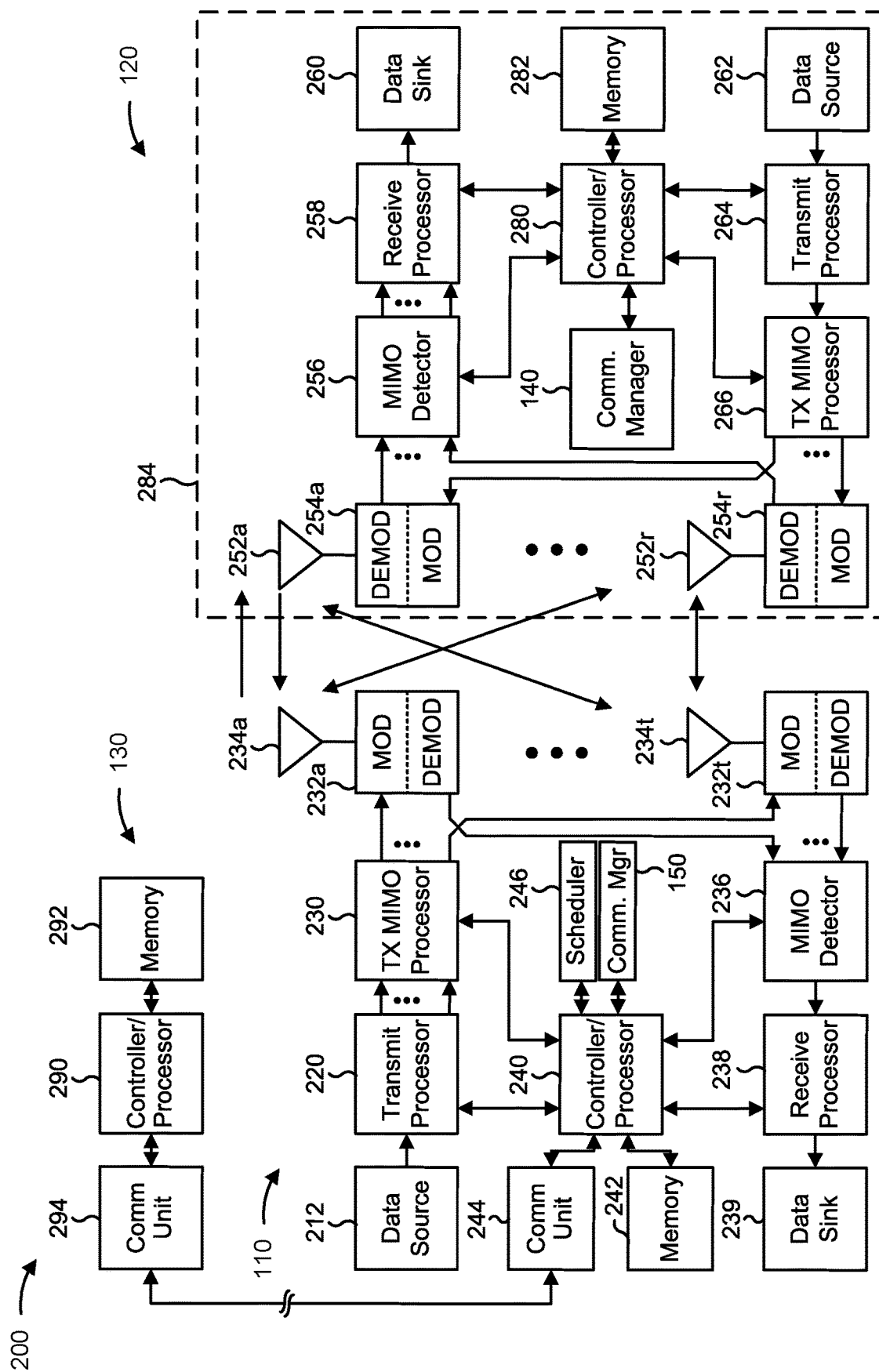
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the base station 110, the controller/processor 280 of the UE 120, and/or any other component(s) of FIG. 2 may perform one or more techniques associated with parameters for combinations of ML models, as described in more detail elsewhere herein. In some aspects, the network node described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting capability information that indicates support for one or more model combinations of ML models, wherein the capability information further indicates one or more performance parameters of an ML model of the ML models with respect to a model combination of the one or more model combinations that includes the ML model; and/or means for receiving one or more indications to use one or more of the ML models based at least in part on the capability information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the base station 110) includes means for receiving capability information that indicates support by a UE for one or more model combinations of ML models, wherein the capability information further indicates one or more performance parameters of an ML model of the one or more ML models with respect to a model combination of the one or more model combinations that includes the ML model; and/or means for transmitting one or more indications to use one or more of the ML models based at least in part on the capability information. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
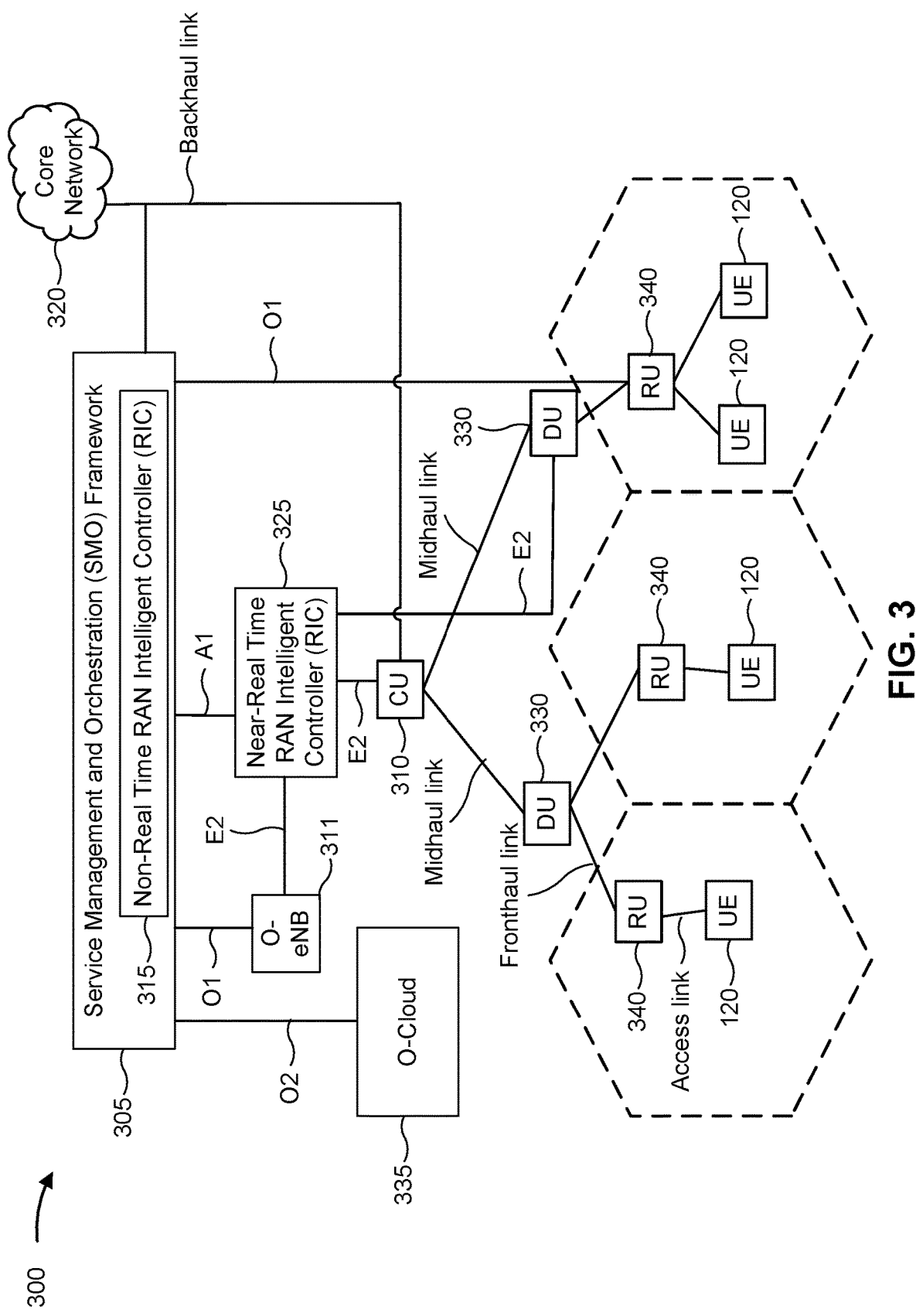
FIG. 3 is a diagram illustrating an example 300 disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RAN RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
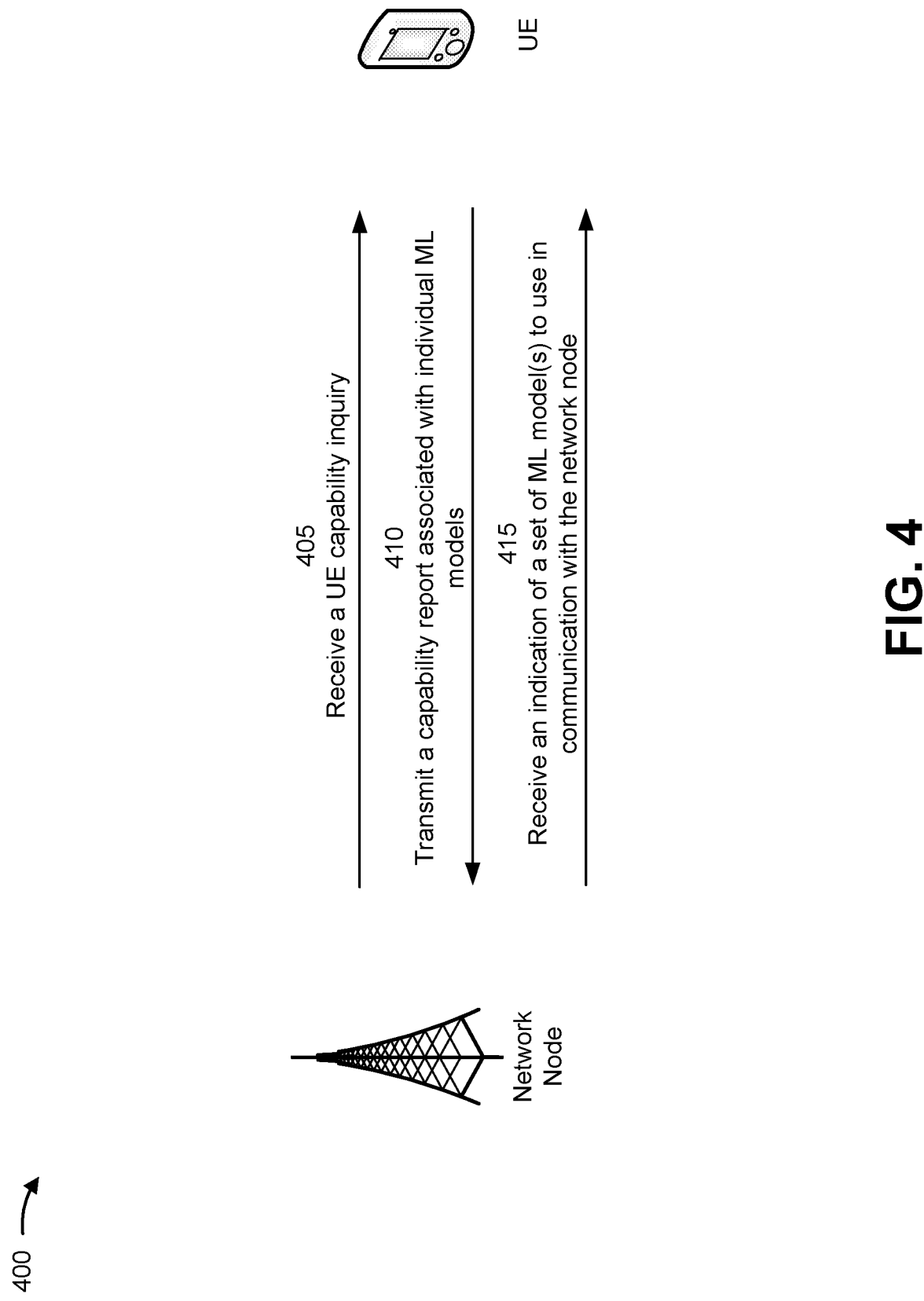
FIG. 4 is a diagram illustrating an example associated with communicating UE capabilities for machine learning models, in accordance with the present disclosure.

FIG. 4 is a diagram illustrating an example 400 associated with communicating UE capabilities for ML models, in accordance with the present disclosure. As shown in FIG. 4, a network node and a UE may communicate via a wireless network (e.g., wireless network 100). The UE may support one or more ML models associated with communicating with the network node.

As shown by reference number 405, the UE may receive, and the network node may transmit, a UE capability inquiry.

For example, the network node may request an indication of supported ML models and/or performance of each of the ML models.

As shown by reference number 410, the UE may transmit, and the network node may receive, a capability report associated with individual ML models. For example, the capability report may indicate each supported ML model and may indicate performance parameters for each of the supported ML models.

As shown by reference number 415, the UE may receive, and the network node may transmit, an indication of a set of one or more ML models to use in communication with the network node. The ML models may include ML models that the UE may perform to improve communication efficiency when communicating via the network node.

The UE may indicate values of performance parameters for each of the ML models when used individually. However, a value associated with a first ML model may change based at least in part on other ML models used in combination with the first ML model.

ML models used in a combination of ML models may compete for resources of the UE, such as central processing unit (CPU) resources, neural processing unit (NPU) resources, graphics processing unit (GPU) resources, memory resources, and/or input/output (I/O) resources of the UE, among other examples. For example, ML models may share and/or contend for special resources other than general resources, such as a special hardware acceleration module like a fast Fourier transform (FFT) module, among other examples.

Additionally, or alternatively, multiple ML models used in combination may target the same or related network functions, such as a first ML model that controls radio resource management (RRM) measurement and a second ML model that controls cell reselection. In this case, the UE may consume resources for the first ML model and the second ML model, which may be unnecessary and/or duplicative, and may consume resources that may have otherwise been used in applying another ML model. Further, multiple ML models used in combination may have dependency, such as a first ML model with output that is used as input for a second ML model.

In some examples, a first ML model may include a CSI reporting ML model for determining a set of subbands to use for reporting. Accurate selection of set of the subbands using the first ML model may improve communication efficiency and/or reduce overhead. However, a second ML model consumes resources needed by the first ML model (e.g., computing resources and/or memory resources, among other examples), the UE may fail to identify the set of subbands before the CSI reporting becomes outdated and/or obsolete.

In these cases, among other examples, reported values of the performance parameters for each of the ML models when used individually may not represent performance parameters of the ML models when used in a model combination of ML models. For example, performance of the ML models when used in a model combination may be reduced and/or diminished to a point where use of the ML models reduces communication efficiency and/or consumes unnecessary power, communication, network, and/or computing resources, based at least in part on, for example, a latency in generating outputs of the ML models.

As indicated above, FIG. 4 is provided as an example. Other examples may differ from what is described with regard to FIG. 4.

In some aspects described herein, a UE may indicate performance parameters for ML models when used in different model combinations. For example, the UE may transmit capability information that indicates support for one or more model combinations of ML models, with the capability information indicating one or more performance parameters of an ML model of the ML models with respect to a model combination of the one or more model combinations that includes the ML model. In some aspects, mapping between a model identification and an indication of a performance class is not fixed, and is based at least in part on a combination in which the associated ML model is used. In some aspects, the performance parameters may be based at least in part on the ML models competing for resources of the UE, such as CPU resources, NPU resources, GPU resources, memory resources, and/or I/O resources of the UE, among other examples.

In some aspects, the UE may indicate supported model combinations and/or may indicate unsupported model combinations (e.g., in a same or separate communication as the indication of performance parameters).

The UE may transmit the capability information including a list of model combinations (e.g., indicating combinations of ML models that the UE can support). The capability information may also include information for a first model combination that indicates a first ML model identification and an associated indication of performance (e.g., a model performance class) of the first ML model when used in the first model combination, and a second ML model identification and an associated indication of performance of the second ML model when used in the first model combination. The information for the first model combination may include indications of performance for any number of ML models supported by the UE for combination. The capability information may also include information for a second model combination that indicates a third ML model identification (e.g., a same ML model identification as the first or second ML model identification or an additional ML model identification) and an associated indication of performance of the third ML model when used in the second model combination, and a fourth ML model identification (e.g., a same ML model identification as the first or second ML model identification or an additional ML model identification) and an associated indication of performance of the fourth ML model when used in the first model combination. In some aspects, an ML model may have different indications of performance when used in different model combinations.

In some aspects, the indication of performance may map to a set of performance metrics and/or values. For example, the indication of performance may include an indication of a performance class that maps to values of performance parameters related to, for example, an AI engine, memory, quantization (e.g., granularity of model outputs), and/or delay in generating outputs. The values of the performance parameters may be explicit values and/or may be relative to values of the performance parameters when the ML models are used independently (e.g., not in combination with other ML models). In some aspects, the mapping may be defined in a table or other data storage structure. The mapping may be defined in a communication protocol, a communication standard, and/or via bilateral or multilateral coordination. For example, UE vendors and infrastructure vendors may share a same understanding on a meaning of each performance class and/or other indication of performance.

In some aspects, the UE may transmit the capability information in an RRC message or other message type that indicates capabilities. The UE may report the capability information via part of a UE radio capability (e.g., received by a base station and forwarded to a core network network node), a UE core network capability (e.g., received by a core network network node and forwarded to a network node), and/or a UE ML capability (e.g., a new indication or combined with the UE radio capability or core network capability information). In some aspects, based at least in part on the UE reporting the capability information associated with model combinations to a first network node, the first network node may forward the capability information to a second network node and/or additional network nodes.

Based at least in part on the UE indicating performance parameters of ML models when used in combination with other ML models, the UE may provide the network node with an indication of performance of the ML models with improved accuracy. In this way, the network node may configure the UE to use a combination of ML models that is based at least in part on the improved accuracy such that performance of the ML models may be sufficient to improve communication efficiency and/or conserve power, communication, network, and/or computing resources that may have otherwise been consumed to attempt to use additional ML models with further reduced performance.

Figure 5:
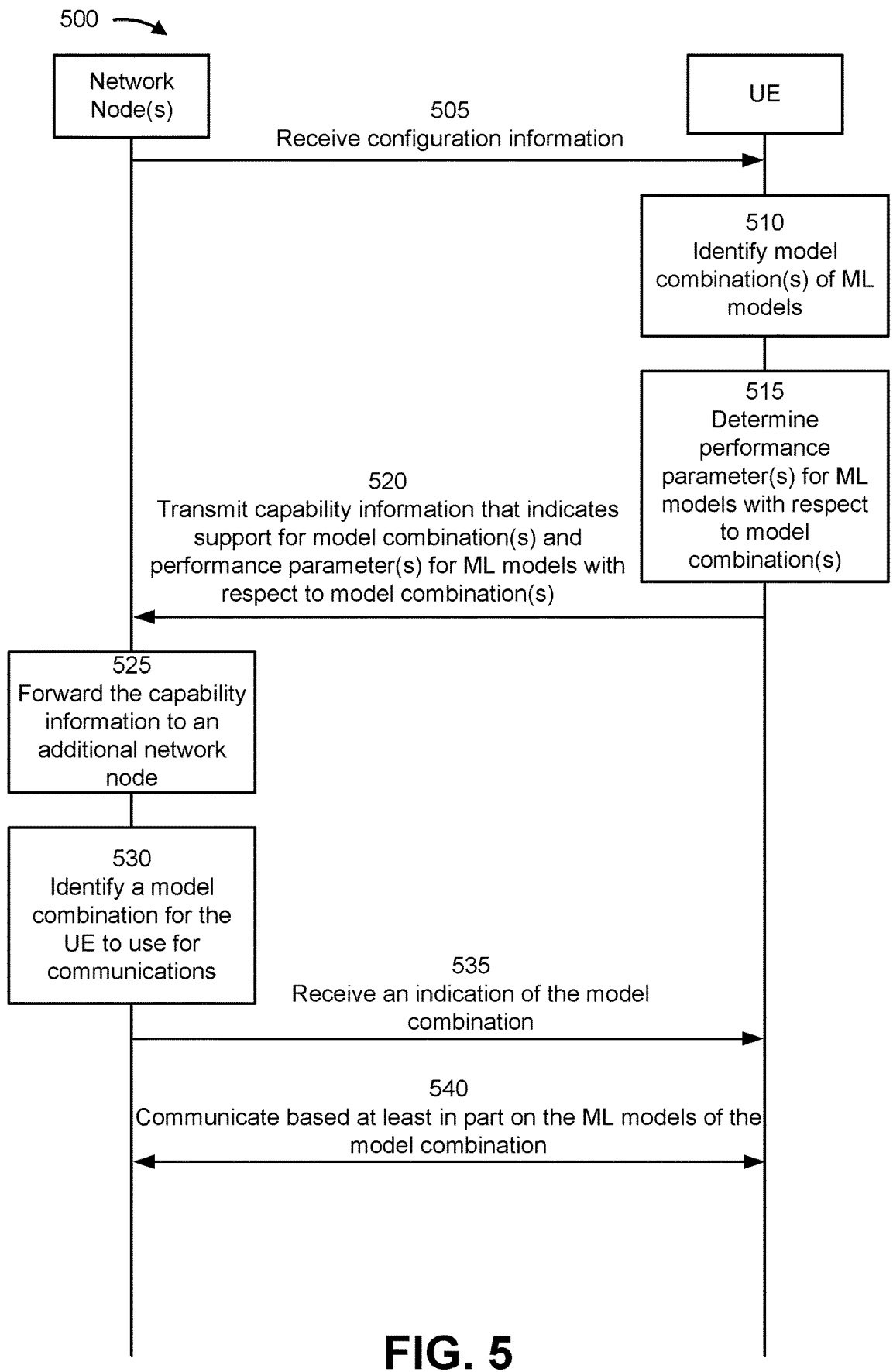
FIGS. 5-7 are diagrams illustrating examples associated with parameters for combinations of machine learning models, in accordance with the present disclosure.

FIG. 5 is a diagram of an example 500 associated with parameters for combinations of ML models, in accordance with the present disclosure. As shown in FIG. 5, one or more network nodes (e.g., base station 110, a core network node, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 5.

As shown by reference number 505, a network node of the one or more network nodes may transmit, and the UE may receive, configuration information. In some aspects, the UE may receive the configuration information via one or more of RRC signaling, one or more medium access control (MAC) control elements (CEs), and/or downlink control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to transmit capability information for using ML models. In some aspects, the configuration information may indicate that the UE is to transmit an indication of a maximum number of ML models that may be combined (e.g., configured for use during communications). Additionally, or alternatively, the configuration information may indicate that the UE is to transmit an indication of supported and/or unsupported model combinations. In some aspects, the configuration information may indicate a configuration for the UE to transmit one or more indications of the capability information. For example, the configuration information may indicate that the UE is to transmit the capability information via an RRC communication. In some aspects, the configuration information may indicate that the UE is to transmit the capability information and a same communication or a different communication from the indication of the maximum number of ML models that may be combined and/or the indication of supported and/or unsupported model combinations.

In some aspects, the configuration information may indicate that the capability information is to indicate one or more performance parameters for respective ML models based at least in part on a model combination of additional ML models used with the respective ML models. In some aspects, the configuration information may indicate that the capability information is to indicate model combinations and one or more performance parameters (e.g., values for one or more performance parameters) for one or more ML models included in the model combinations, with the one or more performance parameters based at least in part on other ML models used in the model combinations. For example, the configuration information may indicate that the capability information is to indicate performance parameters for an ML model for each of the model combinations that include the ML model. The ML model may have different performance parameters for different model combinations.

The UE may configure itself based at least in part on the configuration information. In some aspects, the UE may be configured to perform one or more operations described herein based at least in part on the configuration information.

As shown by reference number 510, the UE may identify one or more model combinations of ML models (e.g., ML models associated with communication with the network node, an additional network node, and/or an application server) that the UE supports and/or that the UE does not support. For example, the UE may identify a support for multiple ML models (e.g., communication-based ML models) based at least in part on overlap of resource demands (e.g., primarily using different processing units), based at least in part on a total resources demand that the UE supports (e.g., based at least in part on hardware and/or software of the UE), based at least in part on target network functions, and/or based at least in part on dependency, among other examples.

In some aspects, the ML models may include one or more decision tree models, one or more decision forest models, one or more convolutional neural network models, one or more cluster models, one or more linear regression models, one or more feedforward neural network models, and/or one or more recurrent neural network model, among other examples. Model combinations may include one or more types of ML models.

As shown by reference number 515, the UE may determine one or more performance parameters for ML models with respect to one or more model combinations. For example, the UE may determine a first set of one or more performance parameters (e.g., AI engine performance, memory performance, quantization (e.g., granularity of model outputs), and/or delay in generating outputs) associated with an ML model based at least in part on the ML model being in a first model combination. Additionally, or alternatively, the UE may determine a second set of one or more performance parameters associated with the ML model based at least in part on the ML model being in a second model combination (e.g., a combination of the ML model with a different set of one or more ML models than the first model combination).

As shown by reference number 520, the UE may transmit, and the network node may receive, capability information that indicates support for one or more model combinations and/or one or more performance parameters for ML models (e.g., ML models for communications) with respect to one or more model combinations. For example, the capability information may indicates a respective performance parameter for respective ML models when used in a model combination. In some aspects, the capability information may indicate a first performance parameters for a first ML model in a model combination, a second performance parameter for a second ML model in the model combination, and/or a third performance parameter for a third ML model in the model combination, etc. In some aspects, a performance parameter for an ML model may be different when indicated for different model combinations.

In some aspects, the capability information may indicate support for the one or more model combinations based at least in part on including an indication of supported model combinations and/or an indication of unsupported model combinations. In some aspects, the UE may transmit the capability information in a capability report. In some aspects, the capability information includes, or is included in, UE radio capability information, ML capability information, and/or core network capability information. In some aspects, the UE may transmit the capability information to the first network node for forwarding to a second network node.

In some aspects, the model combinations may be based at least in part on a first set of the ML models associated with a RAN network node, a second set of the ML models associated with a core network network node, and/or a third set of the ML models associated with an application server. In some aspects, each ML model of a model combination is associated with only one of the RAN network node, a core network network node, or an application server.

In some aspects, the UE may indicate the one or more performance parameters based at least in part on including one or more indications. For example, the one or more indications may include a hash of values of a set of performance metrics of the ML model with respect to the model combination, an indicator (e.g., a mapping indicator) that maps to the values of the set of performance metrics, or a performance class of the ML model with respect to the model combination. In some aspects, the indicator may map to the values of the set of performance metrics based at least in part on a communication protocol and/or a definition that is based at least in part on the UE and/or the network node configured to communicate with the UE. In some aspects, the indicator may map to the values of the set of performance metrics based at least in part on a definition that is based at least in part on a core network node and/or RAN network node (e.g., that are associated with the ML models).

In some aspects, the one or more performance parameters indicate values of processing resources available to apply to the ML model when the ML model is used in the model combination, memory resources available to apply to the ML model when the ML model is used in the model combination, quantization of the ML model when the ML model is used in the model combination, and/or delay in using associated ML models in the model combination.

In some aspects, the UE may transmit the capability information via an RRC message or another type of communication. In some aspects, the RRC message or other type of communication may include an indication of a set of the one or more model combinations supported or unsupported by the UE. In some aspects, the RRC message or other type of communication may include an indication of a maximum number of supported ML models to include in a model combination. In some aspects, the RRC message or other type of communication may include an indication of a first model combination that includes a first indication of model parameters associated with a first ML model of the model combination. The indication of a first model combination may include a second indication of model parameters associated with a second ML model of the model combination. In some aspects, the RRC message or other type of communication may include an indication of a second model combination, that includes a third indication of model parameters associated with a third ML model of the second model combination and a fourth indication of model parameters associated with a fourth ML model of the second model combination. In some aspects, the first ML model or the second ML model may be a same ML model as the third ML model or the fourth ML model, with the same ML model having a different indication of model parameters based at least in part on the same ML model being used in a different model combination. For example, the first ML model and the third ML model may be a same ML model, the first indication of model parameters may be associated with a first set of one or more values, the third indication of model parameters may be associated with a second set of one or more values, and the first set of one or more values may be different from the second set of one or more values.

As shown by reference number 525, the network node may forward the capability information to an additional network node (e.g., a core network node or a RAN network node) of the one or more network nodes. For example, the network node may forward the capability information the additional network node based at least in part on the additional network node being associated with the ML models of the one or more model combinations. For example, a core network node may control, support, and/or be affected by operations associated with ML models for higher layers of communications (e.g., L3 or above). Similarly, a RAN network node may control, support, and/or be affected by operations associated with ML models for lower layers of communications (e.g., L2 or below).

In some aspects, the network node may modify (e.g., add to or remove a portion of) the capability information before forwarding to the additional network node. For example, a first portion of the capability information may be intended for the network node and a second portion of the capability information may be intended for the additional network node (e.g., a core network network node or an additional RAN network node). The network node may forward only the portion of the capability information that is intended (e.g., via a destination identification and/or based at least in part on a type of capability information) for the additional network node.

As shown by reference number 530, the network node may identify a model combination for the UE to use for communications. The network node may identify the model combination based at least in part on the capability information. In some aspects, the network node may identify the model combination to optimize communication efficiency and/or power consumption based at least in part on the one or more performance parameters of the ML models of the model combination.

For example, the network node may identify a first model combination that, if the UE were able to provide full resources for each ML model of the first model combination, would provide a highest amount of communication efficiency. However, based at least in part on the UE indicating that one or more of the ML models of the first model combination would have reduced resources available (e.g., based at least in part on the ML models competing for resources), the first model combination may not provide the highest amount of communication efficiency. For example, a second model combination may include a different set of ML models, which may not be as efficient as those in the first model combination if both had full resource available, with the UE indicating an amount of available resources for the models of the second model combination that would result in the second model combination providing a higher amount of communication efficiency than the first model combination. In this way, the network node may select a model combination based at least in part on resources available to ML models of different model combinations and an amount of communication efficiency gained by using the ML models with the resources available to the ML models.

As shown by reference number 535, the UE may receive, and the network node may transmit, an indication of the model combination. For example, the UE may receive the indication of the model combination based at least in part on the capability information. In this way, the UE may receive an indication to use one or more of the ML models based at least in part on the capability information. For example, the UE may receive an indication to use ML models that belong to the indicated model combination.

As shown by reference number 540, the UE and the network node may communicate based at least in part on the ML models of the model combination. In some aspects, the UE may use a selected model combination to configure wireless communication of the UE (e.g., a RAN configuration). For example, based at least in part on the selected model combination, the UE may configure a connection operation (e.g., a random access channel (RACH) or physical RACH (PRACH) configuration), a traffic management operation, a timing synchronization operation, a measurement operation, a reporting operation (e.g., a channel state information (CSI) report), a reference signal configuration, a handover operation, and/or a resource configuration operation, among other examples.

In some aspects, communicating based at least in part on the ML models may include applying the ML models of the model combination to improve communication efficiency. The UE may apply the set of ML models to one or more network functions, such as RRM measurement, CSI reporting, and/or cell reselection, among other examples.

Based at least in part on the UE indicating performance parameters of ML models when used in combination with other ML models, the UE may provide the network node with an indication of performance of the ML models with improved accuracy. In this way, the network node may configure the UE to use a combination of ML models that is based at least in part on the improved accuracy such that performance of the ML models may be sufficient to improve communication efficiency and/or conserve power, communication, network, and/or computing resources that may have otherwise been consumed to attempt to use additional ML models with further reduced performance.

As indicated above, FIG. 5 is provided as an example. Other examples may differ from what is described with regard to FIG. 5. For example, one or more of the operations described in connection with FIG. 5 may be omitted or performed by an additional node (e.g., network node or UE).

Figure 6:
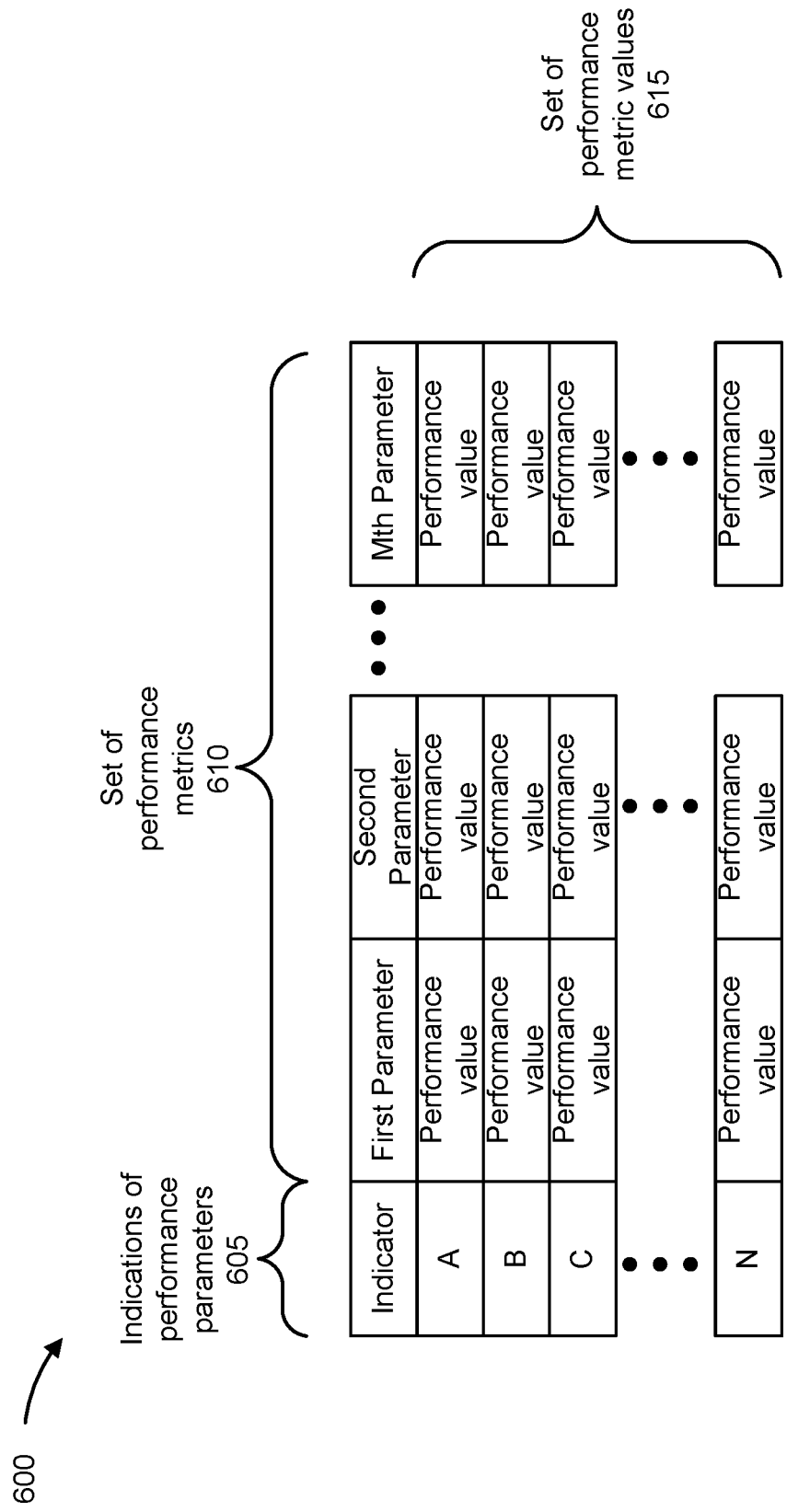

FIG. 6 is a diagram of an example 600 associated with parameters for combinations of ML models, in accordance with the present disclosure. In connection with FIG. 6, one or more network nodes (e.g., base station 110, a core network node, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 6.

As shown in FIG. 6, an indication of performance parameters 605 (e.g., performance classes) for a combination of ML models may be based at least in part on a mapping of the indications of performance parameters 605 to a set of parameters 610 and a set of performance metric values 615 of the set of parameters. For example, an indication that a first ML model is associated with performance indicator A (e.g., performance class A) when in a first model combination indicates that the first ML model is expected to perform with performance values 615 of the set of parameters 610 that are associated with the performance indicator A (e.g., performance values in a same row as indicator A) when used in the first model combination. Similarly, an indication that the first ML model is associated with performance indicator C when in a second model combination indicates that the first ML model is expected to perform with performance values 615 of the set of parameters 610 that are associated with the performance indicator C (e.g., performance values in a same row as indicator C) when used in the second model combination. Other performance indicators map to other combinations of performance values and may be associated with other ML models in one or more model combinations, not just a first ML model.

In some aspects, the performance parameters 605 may similarly include a hash of values of the set of parameters 610. In this way, the indication of performance parameters 605 may use a reduced amount of overhead when compared to an amount of overhead that would be needed to explicitly indicate each of the set of parameters 610 without hashing. In some aspects, an indicator may include a bit value associated with the indicator or may include a bitmap with a bit associated with each candidate indicator.

In some aspects, the capability information may indicate performance indicators for ML models within each indicated model combination. For example, the capability information may include an indication of a model combination set that indicates all reported model combinations. Elements of the model combination set may be model combinations that the UE supports. For a model combination (e.g., for each model combination), the UE may indicate a list of ML models of the model combination and one or more model parameters. The one or more model parameters may include a model identification for included ML models and performance indicators of the ML models (e.g., a performance indicator for each of the included ML models).

As indicated above, FIG. 6 is provided as an example. Other examples may differ from what is described with regard to FIG. 6.

Figure 7:

FIG. 7 is a diagram of an example 700 associated with parameters for combinations of ML models, in accordance with the present disclosure. In connection with FIG. 7, one or more network nodes (e.g., base station 110, a core network node, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 7.

As shown in FIG. 7, the capability information may indicate that the UE supports model combinations of up to four ML models. A model combination list may include a first model combination 705, a second model combination 710, a third model combination 715, a fourth model combination 720, a fifth model combination 725, and/or a sixth model combination 730, among other examples. In some aspects, the model combinations may have a uniform number of model identifications (IDs) or the model combinations may have different numbers of model IDs. For example, each model combination may have a same number of model IDs or some model combinations may have different numbers of Model IDs.

The capability information may indicate that, when used in the first combination 705, model identification (ID) 1 (e.g., an ML model associated with the model ID 1) has a performance indicator 1, model ID 2 has a performance indicator 2, model ID 3 has a performance indicator 3, and model ID 4 has a performance indicator 4. The performance indicators may map to the same or different performance parameters. For example, performance indicators 1 and 3 may be indicator A of FIG. 6, performance indicator 2 may be indicator B of FIG. 6, and/or performance indicator 4 may be indicator C of FIG. 6, each of which is being associated with a set of one or more performance values.

Similarly, the second model combination 710, the third model combination 715, the fourth model combination 720, the fifth model combination 725, and/or the sixth model combination 730 may indicate model IDs of the model combinations and associated indicators. In some aspects, the model IDs have associated indicators that map to different performance values when used in different combinations based at least in part on other ML models used in the different combinations. In some aspects, the model IDs have associated indicators that map to same performance values when used in different combinations based at least in part on other ML models used in the different combinations.

As indicated above, FIG. 7 is provided as an example. Other examples may differ from what is described with regard to FIG. 7.

Figure 8:
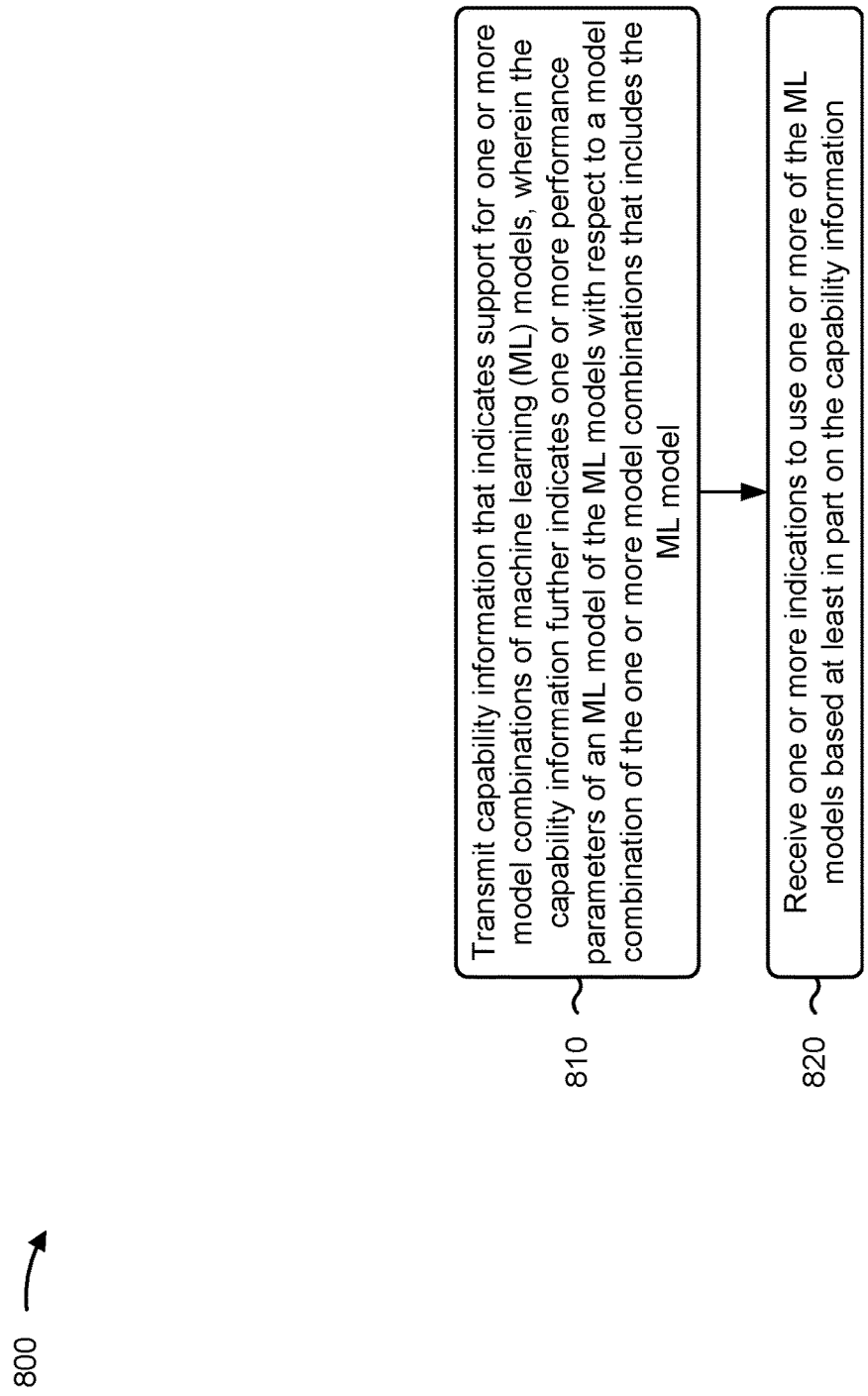
FIGS. 8 and 9 are diagrams illustrating example processes associated with parameters for combinations of machine learning models, in accordance with the present disclosure.

FIG. 8 is a diagram illustrating an example process 800 performed, for example, by a UE, in accordance with the present disclosure. Example process 800 is an example where the UE (e.g., UE 120) performs operations associated with performance indicators for combinations of ML models.

As shown in FIG. 8, in some aspects, process 800 may include transmitting capability information that indicates support for one or more model combinations of ML models, wherein the capability information further indicates one or more performance parameters of an ML model of the ML models with respect to a model combination of the one or more model combinations that includes the ML model (block 810). For example, the UE (e.g., using communication manager 140 and/or transmission component 1004, depicted in FIG. 10) may transmit capability information that indicates support for one or more model combinations of ML models, wherein the capability information further indicates one or more performance parameters of an ML model of the ML models with respect to a model combination of the one or more model combinations that includes the ML model, as described above.

As further shown in FIG. 8, in some aspects, process 800 may include receiving one or more indications to use one or more of the ML models based at least in part on the capability information (block 820). For example, the UE (e.g., using communication manager 140 and/or reception component 1002, depicted in FIG. 10) may receive one or more indications to use one or more of the ML models based at least in part on the capability information, as described above.

Process 800 may include additional aspects, such as any single aspect or any combination of aspects described below and/or in connection with one or more other processes described elsewhere herein.

In a first aspect, a performance parameter of the one or more performance parameters comprises one or more of a hash of values of a set of performance metrics of the ML model with respect to the model combination, an indicator that maps to the values of the set of performance metrics, or a performance class of the ML model with respect to the model combination.

In a second aspect, alone or in combination with the first aspect, the indicator maps to the values of the set of performance metrics based at least in part on one or more of a communication protocol, or a definition that is based at least in part on one or more of the UE or a network node configured to communicate with the UE.

In a third aspect, alone or in combination with one or more of the first and second aspects, the one or more performance parameters indicate values for one or more of processing resources available to apply to the ML model, memory resources available to apply to the ML model, quantization of the ML model, or delay in using associated ML models.

In a fourth aspect, alone or in combination with one or more of the first through third aspects, transmitting the capability information comprises transmitting the capability information via an RRC message.

In a fifth aspect, alone or in combination with one or more of the first through fourth aspects, the RRC message comprises one or more of an indication of a set of the one or more model combinations, an indication of the model combination, comprising a first indication of model parameters associated with the ML model of the model combination, wherein the ML model is a first ML model, and a second indication of model parameters associated with a second ML model of the model combination, or an indication of an additional model combination, comprising a third indication of model parameters associated with a third ML model of the additional model combination, and a fourth indication of model parameters associated with a fourth ML model of the additional model combination.

In a sixth aspect, alone or in combination with one or more of the first through fifth aspects, the first ML model and the third ML model are a same ML model, wherein the first indication of model parameters is associated with a first set of one or more values, wherein the third indication of model parameters is associated with a second set of one or more values, and wherein the first set of one or more values is different from the second set of one or more values.

In a seventh aspect, alone or in combination with one or more of the first through sixth aspects, the capability information comprises one or more of UE radio capability information, ML capability information, or core network capability information.

In an eighth aspect, alone or in combination with one or more of the first through seventh aspects, transmitting the capability information comprises transmitting the capability information to a first network node for forwarding to a second network node.

In a ninth aspect, alone or in combination with one or more of the first through eighth aspects, the one or more model combinations of the ML models are based at least in part on one or more of a first set of the ML models associated with a radio access network (RAN) network node, a second set of the ML models associated with a core network (CN) network node, or a third set of the ML models associated with an application server.

In a tenth aspect, alone or in combination with one or more of the first through ninth aspects, process 800 includes transmitting one or more of an indication of supported model combinations, or an indication of unsupported model combinations.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
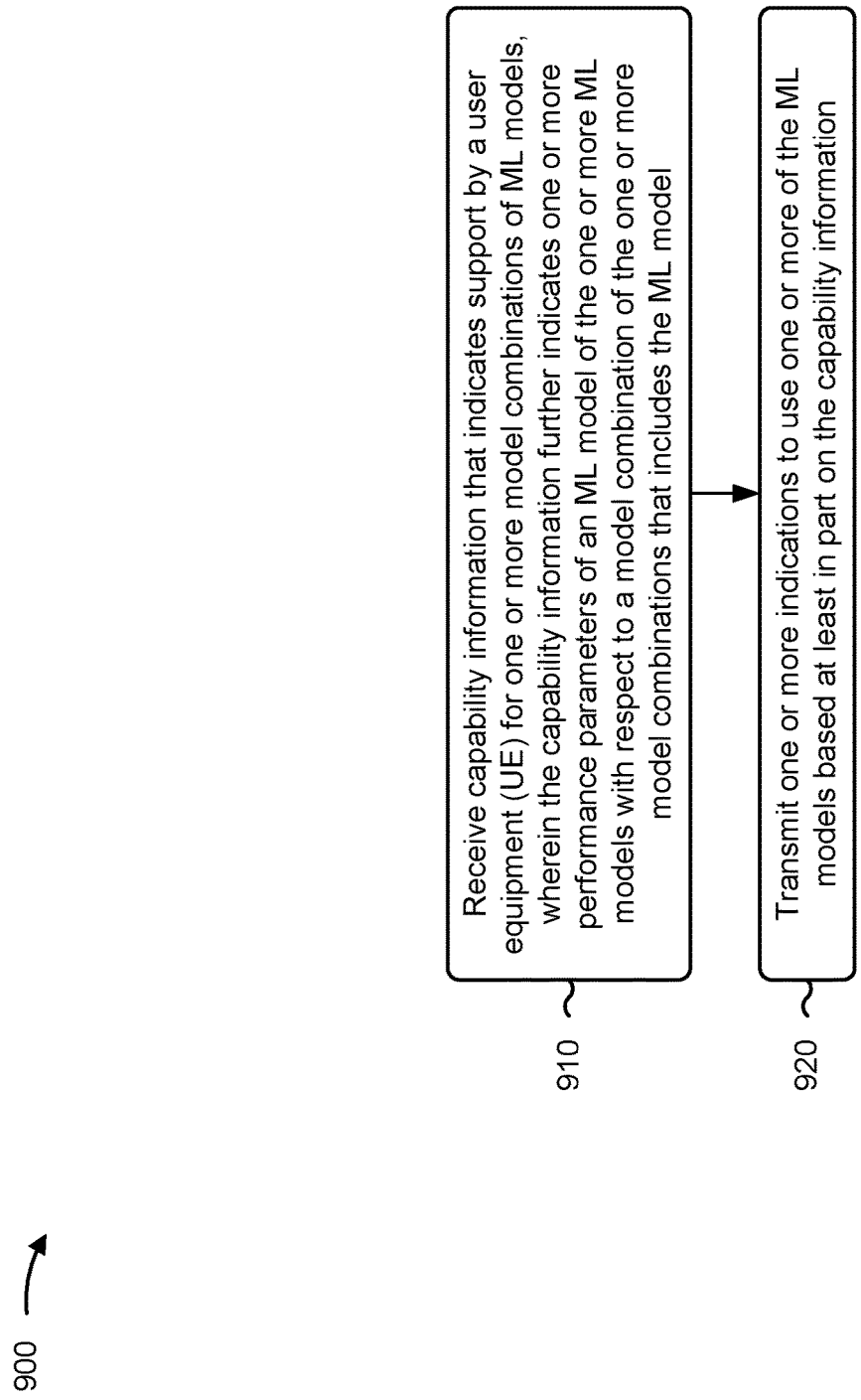

FIG. 9 is a diagram illustrating an example process 900 performed, for example, by a network node, in accordance with the present disclosure. Example process 900 is an example where the network node (e.g., base station 110 and/or a network node of FIG. 5) performs operations associated with performance indicators for combinations of ML models.

As shown in FIG. 9, in some aspects, process 900 may include receiving capability information that indicates support by a UE for one or more model combinations of ML models, wherein the capability information further indicates one or more performance parameters of an ML model of the one or more ML models with respect to a model combination of the one or more model combinations that includes the ML model (block 910). For example, the network node (e.g., using communication manager 150 and/or reception component 1102, depicted in FIG. 11) may receive capability information that indicates support by a UE for one or more model combinations of ML models, wherein the capability information further indicates one or more performance parameters of an ML model of the one or more ML models with respect to a model combination of the one or more model combinations that includes the ML model, as described above.

As further shown in FIG. 9, in some aspects, process 900 may include transmitting one or more indications to use one or more of the ML models based at least in part on the capability information (block 920). For example, the network node (e.g., using communication manager 150 and/or transmission component 1104, depicted in FIG. 11) may transmit one or more indications to use one or more of the ML models based at least in part on the capability information, as described above.

Process 900 may include additional aspects, such as any single aspect or any combination of aspects described below and/or in connection with one or more other processes described elsewhere herein.

In a first aspect, a performance parameter of the one or more performance parameters comprises one or more of a hash of values of a set of performance metrics of the ML model with respect to the model combination, an indicator that maps to the values of the set of performance metrics, or a performance class of the ML model with respect to the model combination.

In a second aspect, alone or in combination with the first aspect, the indicator maps to the values of the set of performance metrics based at least in part on one or more of a communication protocol, or a definition that is based at least in part on one or more of the UE or a network node configured to communicate with the UE.

In a third aspect, alone or in combination with one or more of the first and second aspects, the one or more performance parameters indicate values for one or more of processing resources available to apply to the ML model, memory resources available to apply to the ML model, quantization of the ML model, or delaying in using associated ML models.

In a fourth aspect, alone or in combination with one or more of the first through third aspects, receiving the capability information comprises receiving the capability information via an RRC message.

In a fifth aspect, alone or in combination with one or more of the first through fourth aspects, the RRC message comprises one or more of an indication of a set of the one or more model combinations, an indication of the model combination, comprising a first indication of model parameters associated with the ML model of the model combination, wherein the ML model is a first ML model, and a second indication of model parameters associated with a second ML model of the model combination, or an indication of an additional model combination, comprising a third indication of model parameters associated with a third ML model of the additional model combination, and a fourth indication of model parameters associated with a fourth ML model of the additional model combination.

In a sixth aspect, alone or in combination with one or more of the first through fifth aspects, the first ML model and the third ML model are a same ML model, wherein the first indication of model parameters is associated with a first set of one or more values, wherein the third indication of model parameters is associated with a second set of one or more values, and wherein the first set of one or more values is different from the second set of one or more values.

In a seventh aspect, alone or in combination with one or more of the first through sixth aspects, the capability information comprises one or more of UE radio capability information, ML capability information, or core network capability information.

In an eighth aspect, alone or in combination with one or more of the first through seventh aspects, process 900 includes forwarding at least a portion of the capability information to an additional network node.

In a ninth aspect, alone or in combination with one or more of the first through eighth aspects, the one or more model combinations of the ML models are based at least in part on one or more of a first set of the ML models associated with a RAN network node, a second set of the ML models associated with a CN network node, or a third set of the ML models associated with an application server.

In a tenth aspect, alone or in combination with one or more of the first through ninth aspects, process 900 includes receiving one or more of an indication of supported model combinations, or an indication of unsupported model combinations.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
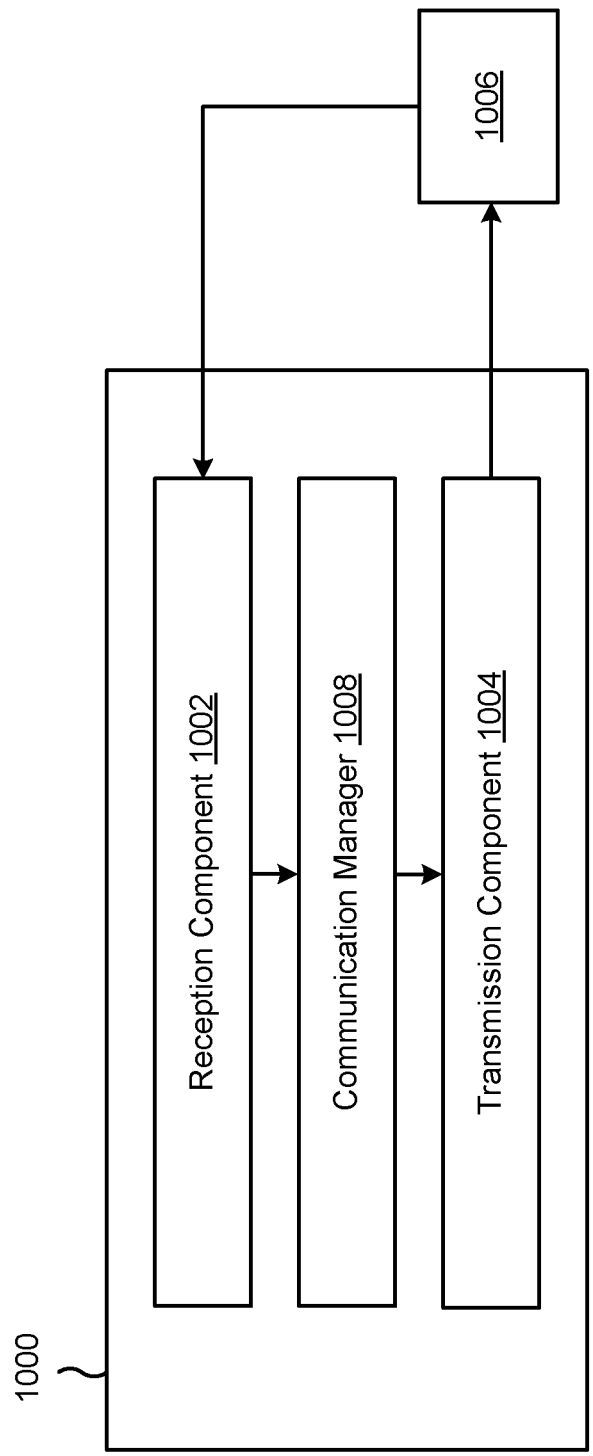
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 140). The communication manager 1008 may transmit control signaling to the transmission component 1004 and/or may receive control signaling via the reception component 1002 to control communications of the apparatus 1000.

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The transmission component 1004 may transmit capability information that indicates support for one or more model combinations of ML models, wherein the capability information further indicates one or more performance parameters of an ML model of the ML models with respect to a model combination of the one or more model combinations that includes the ML model. The reception component 1002 may receive one or more indications to use one or more of the ML models based at least in part on the capability information.

The transmission component 1004 may transmit one or more of an indication of supported model combinations, or an indication of unsupported model combinations.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
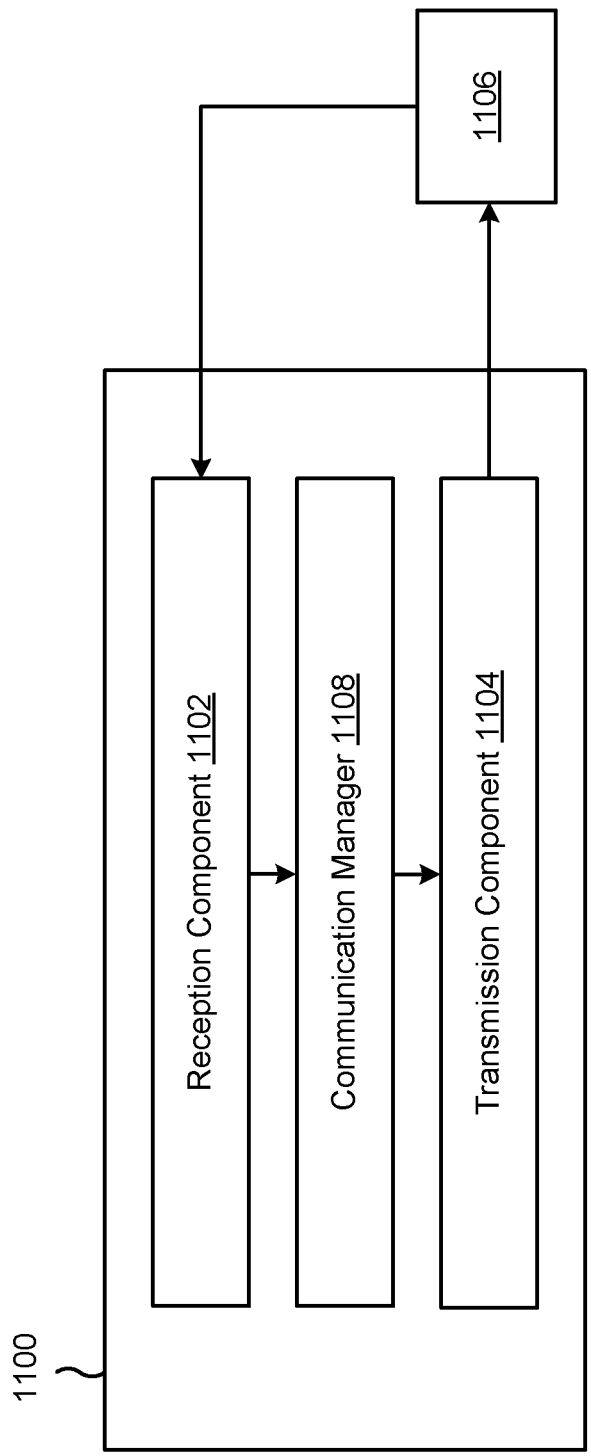

FIG. 11 is a diagram of an example apparatus 1100 for wireless communication. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 150). The communication manager 1108 may transmit control signaling to the transmission component 1104 and/or may receive control signaling via the reception component 1102 to control communications of the apparatus 1100.

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The reception component 1102 may receive capability information that indicates support by a UE for one or more model combinations of ML models, wherein the capability information further indicates one or more performance parameters of an ML model of the one or more ML models with respect to a model combination of the one or more model combinations that includes the ML model. The transmission component 1104 may transmit one or more indications to use one or more of the ML models based at least in part on the capability information.

The communication manager 1108 and/or the transmission component 1104 may forward at least a portion of the capability information to an additional network node.

The reception component 1102 may receive one or more of an indication of supported model combinations, or an indication of unsupported model combinations.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting capability information that indicates support for one or more model combinations of machine learning (ML) models, wherein the capability information further indicates one or more performance parameters of an ML model of the ML models with respect to a model combination of the one or more model combinations that includes the ML model; and receiving one or more indications to use one or more of the ML models based at least in part on the capability information.

Aspect 2: The method of Aspect 1, wherein a performance parameter of the one or more performance parameters comprises one or more of: a hash of values of a set of performance metrics of the ML model with respect to the model combination, an indicator that maps to the values of the set of performance metrics, or a performance class of the ML model with respect to the model combination.

Aspect 3: The method of Aspect 2, wherein the indicator maps to the values of the set of performance metrics based at least in part on one or more of: a communication protocol, or a definition that is based at least in part on one or more of the UE or a network node configured to communicate with the UE.

Aspect 4: The method of any of Aspects 1-3, wherein the one or more performance parameters indicate values for one or more of: processing resources available to apply to the ML model, memory resources available to apply to the ML model, quantization of the ML model, or delay in using associated ML models.

Aspect 5: The method of any of Aspects 1-4, wherein transmitting the capability information comprises: transmitting the capability information via a radio resource control (RRC) message.

Aspect 6: The method of Aspect 5, wherein the RRC message comprises one or more of: an indication of a set of the one or more model combinations; an indication of the model combination, comprising: a first indication of model parameters associated with the ML model of the model combination, wherein the ML model is a first ML model, and a second indication of model parameters associated with a second ML model of the model combination, or an indication of an additional model combination, comprising: a third indication of model parameters associated with a third ML model of the additional model combination, and a fourth indication of model parameters associated with a fourth ML model of the additional model combination.

Aspect 7: The method of Aspect 6, wherein the first ML model and the third ML model are a same ML model, wherein the first indication of model parameters is associated with a first set of one or more values, wherein the third indication of model parameters is associated with a second set of one or more values, and wherein the first set of one or more values is different from the second set of one or more values.

Aspect 8: The method of any of Aspects 1-7, wherein the capability information comprises one or more of: UE radio capability information, ML capability information, or core network capability information.

Aspect 9: The method of any of Aspects 1-8, wherein transmitting the capability information comprises: transmitting the capability information to a first network node for forwarding to a second network node.

Aspect 10: The method of any of Aspects 1-9, wherein the one or more model combinations of the ML models are based at least in part on one or more of: a first set of the ML models associated with a radio access network (RAN) network node, a second set of the ML models associated with a core network (CN) network node, or a third set of the ML models associated with an application server.

Aspect 11: The method of any of Aspects 1-10, further comprising transmitting one or more of: an indication of supported model combinations, or an indication of unsupported model combinations.

Aspect 12: A method of wireless communication performed by a network node, comprising: receiving capability information that indicates support by a user equipment (UE) for one or more model combinations of machine learning (ML) models, wherein the capability information further indicates one or more performance parameters of an ML model of the one or more ML models with respect to a model combination of the one or more model combinations that includes the ML model; and transmitting one or more indications to use one or more of the ML models based at least in part on the capability information.

Aspect 13: The method of Aspect 12, wherein a performance parameter of the one or more performance parameters comprises one or more of: a hash of values of a set of performance metrics of the ML model with respect to the model combination, an indicator that maps to the values of the set of performance metrics, or a performance class of the ML model with respect to the model combination.

Aspect 14: The method of any of Aspects 12-13, wherein the indicator maps to the values of the set of performance metrics based at least in part on one or more of: a communication protocol, or a definition that is based at least in part on one or more of the UE or a network node configured to communicate with the UE.

Aspect 15: The method of any of Aspects 12-14, wherein the one or more performance parameters indicate values for one or more of: processing resources available to apply to the ML model, memory resources available to apply to the ML model, quantization of the ML model, or delay in using associated ML models.

Aspect 16: The method of any of Aspects 12-15, wherein receiving the capability information comprises: receiving the capability information via a radio resource control (RRC) message.

Aspect 17: The method of Aspect 16, wherein the RRC message comprises one or more of: an indication of a set of the one or more model combinations; an indication of the model combination, comprising: a first indication of model parameters associated with the ML model of the model combination, wherein the ML model is a first ML model, and a second indication of model parameters associated with a second ML model of the model combination, or an indication of an additional model combination, comprising: a third indication of model parameters associated with a third ML model of the additional model combination, and a fourth indication of model parameters associated with a fourth ML model of the additional model combination.

Aspect 18: The method of any of Aspects 17, wherein the first ML model and the third ML model are a same ML model, wherein the first indication of model parameters is associated with a first set of one or more values, wherein the third indication of model parameters is associated with a second set of one or more values, and wherein the first set of one or more values is different from the second set of one or more values.

Aspect 19: The method of any of Aspects 12-18, wherein the capability information comprises one or more of: UE radio capability information, ML capability information, or core network capability information.

Aspect 20: The method of any of Aspects 12-19, further comprising: forwarding at least a portion of the capability information to an additional network node.

Aspect 21: The method of any of Aspects 12-20, wherein the one or more model combinations of the ML models are based at least in part on one or more of: a first set of the ML models associated with a radio access network (RAN) network node, a second set of the ML models associated with a core network (CN) network node, or a third set of the ML models associated with an application server.

Aspect 22: The method of any of Aspects 12-21, further comprising receiving one or more of: an indication of supported model combinations, or an indication of unsupported model combinations.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    memory; and
    one or more processors, coupled to the memory, configured to:
        transmit capability information that indicates:
            supported or unsupported model combinations of machine learning (ML) models, and
            one or more performance parameters associated with an ML model of the ML models based at least in part on the ML model being included in a model combination; and
        receive one or more indications to use one or more of the ML models based at least in part on the capability information.

2. The UE of claim 1, wherein a performance parameter of the one or more performance parameters comprises one or more of:
    a hash of values of a set of performance metrics of the ML model based at least in part on the ML model being included in the model combination,
    an indicator that maps to the values of the set of performance metrics, or
    a performance class of the ML model based at least in part on the ML model being included in the model combination.

3. The UE of claim 2, wherein the indicator maps to the values of the set of performance metrics based at least in part on one or more of:
    a communication protocol, or
    a definition that is based at least in part on one or more of the UE or a network node configured to communicate with the UE.

4. The UE of claim 1, wherein the one or more performance parameters indicate values for one or more of:
    processing resources available to apply to the ML model,
    memory resources available to apply to the ML model,
    quantization of the ML model, or
    delay in using associated ML models.

5. The UE of claim 1, wherein the one or more processors, to transmit the capability information, are configured to:
    transmit the capability information via a radio resource control (RRC) message.

6. The UE of claim 5, wherein the RRC message comprises one or more of:
    an indication of the model combination, comprising:
        a first indication of model parameters associated with the ML model, wherein the ML model is a first ML model, and
        a second indication of model parameters associated with a second ML model included in the model combination, or
    an indication of an additional model combination, comprising:
        a third indication of model parameters associated with a third ML model included in the additional model combination, and
        a fourth indication of model parameters associated with a fourth ML model included in the additional model combination.

7. The UE of claim 6, wherein the first ML model and the third ML model are a same ML model,
    wherein the first indication of model parameters is associated with a first set of one or more values,
        wherein the third indication of model parameters is associated with a second set of one or more values, and
        wherein the first set of one or more values is different from the second set of one or more values.

8. The UE of claim 1, wherein the capability information comprises one or more of:
    UE radio capability information,
    ML capability information, or
    core network capability information.

9. The UE of claim 1, wherein the one or more processors, to transmit the capability information, are configured to:
    transmit the capability information to a first network node for forwarding to a second network node.

10. The UE of claim 1, wherein the supported or unsupported model combinations of the ML models are based at least in part on one or more of:
    a first set of the ML models associated with a radio access network (RAN) network node,
    a second set of the ML models associated with a core network (CN) network node, or
    a third set of the ML models associated with an application server.

11. A network node for wireless communication, comprising:
    memory; and
    one or more processors, coupled to the memory, configured to:
        receive capability information associated with a user equipment (UE) that indicates:
            supported or unsupported model combinations of machine learning (ML) models, and
            one or more performance parameters of an ML model of the one or more ML models based at least in part on the ML model being included in a model combination; and
        transmit one or more indications to use one or more of the ML models based at least in part on the capability information.

12. The network node of claim 11, wherein a performance parameter of the one or more performance parameters comprises one or more of:
    a hash of values of a set of performance metrics of the ML model based at least in part on the ML model being included in the model combination,
    an indicator that maps to the values of the set of performance metrics, or
    a performance class of the ML model based at least in part on the ML model being included in the model combination.

13. The network node of claim 12, wherein the indicator maps to the values of the set of performance metrics based at least in part on one or more of:
   a communication protocol, or
   a definition that is based at least in part on one or more of the UE or a network node configured to communicate with the UE.

14. The network node of claim 11, wherein the one or more performance parameters indicate values for one or more of:
   processing resources available to apply to the ML model,
   memory resources available to apply to the ML model,
   quantization of the ML model, or
   delay in using associated ML models.

15. The network node of claim 11, wherein the one or more processors, to receive the capability information, are configured to:
   transmit the capability information via a radio resource control (RRC) message.

16. The network node of claim 15, wherein the RRC message comprises one or more of:
   an indication of the model combination, comprising:
      a first indication of model parameters associated with the ML model, wherein the ML model is a first ML model, and
      a second indication of model parameters associated with a second ML model included in the model combination, or
   an indication of an additional model combination, comprising:
      a third indication of model parameters associated with a third ML model included in the additional model combination, and
      a fourth indication of model parameters associated with a fourth ML model included in the additional model combination.

17. The network node of claim 16, wherein the first ML model and the third ML model are a same ML model,
   wherein the first indication of model parameters is associated with a first set of one or more values,
      wherein the third indication of model parameters is associated with a second set of one or more values, and
      wherein the first set of one or more values is different from the second set of one or more values.

18. The network node of claim 11, wherein the capability information comprises one or more of:
   UE radio capability information,
   ML capability information, or
   core network capability information.

19. The network node of claim 11, wherein the one or more processors are further configured to:
   forward at least a portion of the capability information to an additional network node.

20. The network node of claim 11, wherein the supported or unsupported model combinations of the ML models are based at least in part on one or more of:
   a first set of the ML models associated with a radio access network (RAN) network node,
   a second set of the ML models associated with a core network (CN) network node, or
   a third set of the ML models associated with an application server.

21. A method of wireless communication performed by a user equipment (UE), comprising:
   transmitting capability information that indicates;
   supported or unsupported model combinations of machine learning (ML) models, and
   one or more performance parameters of an ML model of the ML models based at least in part on the ML model being included in a model combination; and
   receiving one or more indications to use one or more of the ML models based at least in part on the capability information.

22. The method of claim 21, wherein a performance parameter of the one or more performance parameters comprises one or more of:
   a hash of values of a set of performance metrics of the ML model based at least in part on the ML model being included in the model combination,
   an indicator that maps to the values of the set of performance metrics, or
   a performance class of the ML model based at least in part on the ML model being included in the model combination.

23. The method of claim 21, wherein transmitting the capability information comprises:
   transmitting the capability information via a radio resource control (RRC) message.

24. The method of claim 23, wherein the RRC message comprises one or more of:
   an indication of the model combination, comprising:
      a first indication of model parameters associated with the ML model, wherein the ML model is a first ML model, and
      a second indication of model parameters associated with a second ML model included in the model combination, or
   an indication of an additional model combination, comprising:
      a third indication of model parameters associated with a third ML model [of] included in the additional model combination, and
      a fourth indication of model parameters associated with a fourth ML model included in the additional model combination.

25. A method of wireless communication performed by a network node, comprising:
   receiving capability information associated with a user equipment (UE) that indicates:
      supported or unsupported model combinations of machine learning (ML) models, and
      one or more performance parameters of an ML model of the one or more ML models based at least in part on the ML model being included in a model combination; and
   transmitting one or more indications to use one or more of the ML models based at least in part on the capability information.

26. The method of claim 25, wherein a performance parameter of the one or more performance parameters comprises one or more of:
   a hash of values of a set of performance metrics of the ML model based at least in part on the ML model being included in the model combination,
   an indicator that maps to the values of the set of performance metrics, or
   a performance class of the ML model based at least in part on the ML model being included in the model combination.

27. The method of claim 25, wherein receiving the capability information comprises:
   transmitting the capability information via a radio resource control (RRC) message.

28. The method of claim 27, wherein the RRC message comprises one or more of:
   an indication of the model combination, comprising:
      a first indication of model parameters associated with the ML model, wherein the ML model is a first ML model, and
      a second indication of model parameters associated with a second ML model included in the model combination, or an indication of an additional model combination, comprising:
- a third indication of model parameters associated with a third ML model included in the additional model combination, and
- a fourth indication of model parameters associated with a fourth ML model included in the additional model combination.

29. The method of claim 21, wherein the one or more performance parameters indicate values for one or more of:
processing resources available to apply to the ML model,
memory resources available to apply to the ML model,
quantization of the ML model, or
delay in using associated ML models.

30. The method of claim 21, wherein the capability information comprises one or more of:
UE radio capability information,
ML capability information, or
core network capability information.

* * * * *